Oct. 9, 1934.  J. R. PLASTERS  1,975,864
FISH STRINGER
Filed April 16, 1932
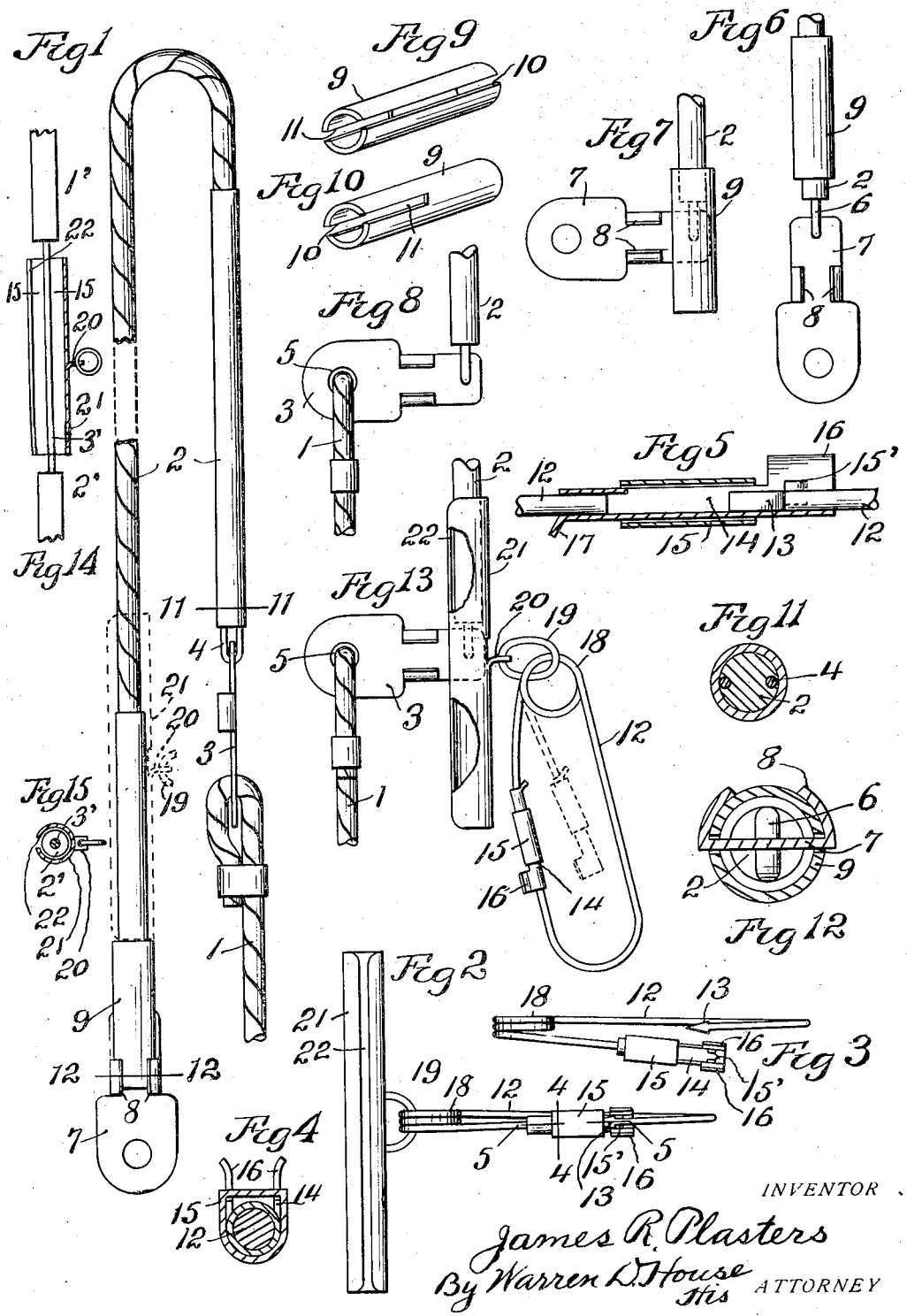
INVENTOR
James R. Plasters
By Warren D. House
His ATTORNEY Patented Oct. 9, 1934

1,975,864

UNITED STATES PATENT OFFICE 1,975,864

FISH STRINGER

James R. Plasters, Kansas City, Mo.

Application April 16, 1932, Serial No. 605,591

7 Claims. (Cl. 224—7)

My invention relates to improvements in fish stringers.

One of the objects of my invention is to provide a fish stringer with a novel stringing line. A further object is the provision of a novel fish holder, which will permit the easy and quick impaling of a fish thereon and which will securely hold the fish so impaled.

Still another object of my invention is the provision of a novel fish holding device which can be mounted upon or removed from a stringing line at a point intermediate of the ends of the line and without having the ends of the line free during such mounting or removal.

My invention provides further a fish stringer which is simple, strong, cheap to make, durable, not likely to get out of order and which will securely hold the fish thereon.

The novel features of my invention are hereinafter fully described and claimed.

In the accompanying drawing, which illustrates my invention,

Fig. 1 is a side view of one form of my improved fish stringing line, partly broken away.

Fig. 2 is a plan view of one form of my improved fish holding device, the fish holding member being shown in the closed position.

Fig. 3 is a similar view of the fish holding member detached from the tubular line engaging member, and shown in the open position.

Fig. 4 is a section, enlarged, on the line 4—4 of Fig. 2.

Fig. 5 is an enlarged section on the line 5—5 of Fig. 2.

Fig. 6 is a view of the removal end portion of the stringing line, shown in the holding position.

Fig. 7 is a view similar to Fig. 6, with the pivoted member at the end of the stringing line shown in the fish removing position, the locking member being shown partly removed.

Fig. 8 is a view similar to Fig. 7, the locking member being removed.

Fig. 9 is one perspective view of the tubular locking member shown in Figs. 7 and 8.

Fig. 10 is another perspective view of the locking member shown in Fig. 9.

Fig. 11 is an enlarged section on the line 11—11 of Fig. 1.

Fig. 12 is an enlarged section on the line 12—12 of Fig. 1.

Fig. 13 is a side elevation of a portion of the stringing line, shown in Fig. 1, and of the fish holding device shown partly mounted on the line.

Fig. 14 is a side view showing a modification in which a portion of the fish holding device is shown in longitudinal section and mounted on the stringing line, a portion only of which is shown.

Fig. 15 is a section on the line 15—15 of Fig. 14.

Similar characters of reference designate similar parts in the different views.

Referring to Figs. 1 to 13, the fish stringing line comprises a portion 1, Fig. 1, adapted to be connected to a stake or other anchoring device, not shown, another end portion 2 on which the fish are adapted to be strung, and an intermediate portion 3 connecting the portions 1 and 2.

The connecting portion 3 comprises a relatively thin plate pivoted at one end to a staple 4 in the adjacent end of the portion 2, and adjacent to its other end having a hole 5, Fig. 8, through which extends the adjacent end portion of the portion 1 of the stringing line.

For releasably holding the fish on the fish stringing line, and for permitting them to be removed therefrom, as will be described later, the free end of the portion 2 has a staple 6 to which is pivoted a stop plate 7, similar to the plate 3, and having at its opposite edges two flanges 8 which curve toward each other, and between which is adapted to enter one end of a tube 9, which is longitudinally slidable onto and off from the portion 2, when the stop plate 7 is swung to the right angled position shown in Fig. 7.

To enable the tube 9 to slide over the pivoted end of the stop plate 7, the tube 9 has two opposite disposed longitudinal slots 10 and 11, the slot 10 extending the full length of the tube 9, so as to permit the tube to slide onto and off from the plate 7, when the latter is in the angular position, shown in Fig. 7. When the tube 9 is in the locking position shown in Fig. 1, the opposite edges of the plate 7 respectively enter the slots 10 and 11, and the flanges 8 hold the plate 7 from turning on the staple 6.

For stringing fish on the stringing line, there may be provided a plurality of fish holding devices, which are alike, and one of which is shown and described.

A transversely divided loop like fish holding member 12, Figs. 2, 3 and 13, the body of which is, preferably, a spring wire, has at one end a spear like head 13 which forms an impaling portion for passing through the lips of a fish. The other free end portion is provided with an outwardly facing channel portion 14 adapted to receive the spear head portion 13. The side walls of the channel portion 14 are respectively provided with inwardly extending projections 15' adapted to engage the spear head 13, as shown in Figs. 2 and 5, to hold the spear head end from pulling lengthwise from the channel portion 14.

To disengage the spear head portion 13 from the channel portion 14, to engage a fish or to remove it from the fish holding member, the portion of the latter provided with the channel portion 14 is inwardly depressible to the position shown in dotted lines in Fig. 13. By facing the channel portion 14 outwardly and having it inwardly depressible, the channel portion can be depressed without having the hand which depresses it touch the fish, while, if the channel portion faced inwardly, as in a safety pin, the spear head end, which carries the fish would have to be depressed, and the hand which effected the depressing would have to contact with the fish held on such end portion of the fish holding member.

To releasably hold the channel portion 14 from being accidentally depressed so as to possibly permit the fish to disengage from the fish holding member 12, there is provided a locking member which is movable to and from a position over the channel portion 14 and the spear head portion 13. Such locking member, as shown in Figs. 2, 3, 4, 5 and 13, comprises a tube 15, which is longitudinally slidable to and from a position in which it covers the spear head 13, as in Figs. 2, 5 and 13.

The outer end of the channel portion 14 has at its opposite sides two outwardly flaring flanges 16 which serve as a stop limiting the outward movement of the tube 15. The inner end of the channel portion 14 has a projection 17 which limits the inner movement of the tube 15, Figs. 5 and 13.

To release the channel portion 14 from the spear head portion 13, the tube 15 is slipped inwardly to the release position shown in Fig. 3, after which the channel portion 14 is depressed inwardly to the position shown in dotted lines in Fig. 13. The tube 15 snugly fits the channel portion 14 so as to be reliably held in the position to which it is adjusted.

Either of the flanges 16 may also be employed to hold depressed the channel portion 14, so as to leave both hands free for impaling a fish. By depressing the channel portion 14 further than is shown in dotted lines in Fig. 13 and to a position in which the flanges 16 will be at the outer side of the opposite portion of the wire 12, and then permitting the resilient portion having the channel portion 14, to relax in contact with said opposite portion, the latter will strike the abrupt angled inner end of the adjacent flange 16, which provides a notch adapted to receive and releasably hold the channel portion 14 depressed.

The end of the holder 12 distant from the spear head portion 13 is ring shaped to provide greater resiliency and also to serve as a finger hold when fastening or unfastening the channel portion 14, said ring portion being designated by 18.

Attached to this ring portion 18 is a link 19 which pivotally engages an outwardly projecting flange 20 in the middle of and on one side of tube 21, which on the opposite side is provided with a slot 22 which extends the length of the tube 21, which slot enables the tube to be slipped over the pivoted plate 3, and onto the stringer portion 2, when the plate 3 is in the angular position, shown in Figs. 8 and 13. Said slot 22 also enables the tube 21 to be slipped off from the plate 7 when the latter is in the angular position shown in Fig. 7, the tube 9 having been removed from the stringing line.

In stringing a fish, the channel portion 14 is depressed, as shown in dotted lines in Fig. 13, the tube 15 having been slid to the release position, shown in Fig. 3. The spear head portion 13 is then inserted through the lips of the fish, or other parts thereof, after which the channel portion 14 is permitted to again engage the portion 13, and the tube 15 is slipped to the locking position, shown in Figs. 2, 5 and 13.

The plate 3 is then turned to the angular position shown in Figs. 8 and 13, after which the tube 21 is slipped over the plate 3 and onto the portion 2, and thence downwardly to the locking tube 9. To remove the holder 12 and its support, the tube 21, together with the fish held by the holder, the tube 9 is removed in the manner already described, and the plate 7 is turned to the angular position, when the tube 21 may be slid from the stringer line over the plate 7.

In the modification, shown in Figs. 14 and 15, the parts 1' and 2', corresponding to the parts 1 and 2 of the other form, are connected by a wire or rod 3' which is longer than the tube 21 and is less in diameter than the width of the slot 22 of said tube. The tube 21, with its holder 12 may be attached to the portions 1' or 2' by slipping the wire or rod 3' through the slot 22 and then sliding the tube onto either portion of the stringer line, preferably onto the portion 2', the free end of which is equipped with the plate 7 and tube 9, the same as are provided on the free end of the portion 2.

I do not limit my invention to the structures shown and described, as many modifications, other than shown and within the scope of the appended claims, may be made without departing from the spirit of my invention.

What I claim is:—

1. In a fish stringer, a stringing line comprising two portions and an intermediate connecting portion, a member slidable on one of said two portions and having a longitudinal slot extending its full length of less width than the diameter of said two portions and of greater width than the thickness of said connecting portion, the latter being insertible through said slot into said member to a position in which said member will aline with and be slidable onto and off from said one of said two portions, and means for releasably attaching a fish to said member.

2. In a fish stringer, a stringing line comprising two end portions and an intermediate portion flexibly connecting said two end portions, whereby one of said end portions may be swung from a position alining with the other end portion to a position at an angle thereto, a tubular member slidable upon one of said end members and having a longitudinal slot extending its full length of less width than the diameter of said end portions and of greater width than the thickness of said connecting portion for a portion of the length of the latter, said member having greater length than said portion of the length of said connecting portion, and slidable lengthwise onto and off from one of said end portions when the other end portion is swung to said angular position, and means for releasably attaching a fish to said member.

3. In a fish stringer, a stringing line comprising two end portions and an intermediate portion connecting said end portions and pivoted to one of said end portions so as to be swung from a position alined therewith to a position at an angle thereto, and having a portion of its length of less thickness than the diameter of said end portions, a tubular member longitudinally slidable on said end portion to which said connecting portion is pivoted, and having a longitudinal slot extending its full length of less width than the diameter of the end portion on which it is slidable and of greater width than the thickness of said connecting portion, whereby when the connecting portion is in the angular position, the said member may be slid over the connecting portion onto the portion to which it is pivoted, and means for releasably attaching a fish to said member.

4. In a fish stringer a stringing line having attached to one end a hinge member, a second hinge member pivoted to said first named hinge member so as to be swung from an alined position therewith to a position at an angle thereto, a tubular member slidable on said stringing line and upon said first named hinge member and having a longitudinal slot extending its full length of less width than the diameter of said stringing line and said first named hinge member and of greater width than the portion of said second hinge member outside of and next to said first named hinge member, whereby, when said second hinge member is in the angular position, said tubular member may be slid thereover onto said first named hinge member, said second named hinge member having means for holding said tubular member from sliding therefrom when the second named hinge member is in the alined position, and means for releasably attaching a fish to said tubular member.

5. In a fish stringer, a stringing line having intermediate of its ends a portion of less thickness than the adjacent portions of the line, a tubular member longitudinally slidable on said line and having a slot extending the full length of said member of a width greater than the thickness of said intermediate portion said slot having less width than said adjacent portions, whereby by passing said intermediate portion through said slot, said member may be slipped onto or off from said line, and means for releasably attaching a fish to said member.

6. In a fish stringer, a transversely divided loop like fish holding member having two free end portions one of which is adapted to impale a fish, its other free end portion being resilient and being depressible to a position in which a part of it will be at the outer side of the opposite portion of said loop like member, said part having an abrupt angled notch adapted to receive and releasably lockingly engage said opposite portion and hold said resilient portion depressed.

7. In a fish stringer, a transversely divided loop like fish holding member having two free end portions one of which is adapted to impale a fish, its other free end portion being resilient and having a channel portion adapted when said resilient portion is relaxed to receive said impaling portion, said resilient portion being depressible to a position in which a part of it will be at the outer side of the opposite portion of said loop like member, said part having an outwardly laterally extending flange provided with an abrupt angled inner end adapted to engage the outer side of said opposite portion and releasably hold said resilient portion depressed.

JAMES R. PLASTERS.